US011379051B2

(12) United States Patent
Swanson et al.

(10) Patent No.: US 11,379,051 B2
(45) Date of Patent: Jul. 5, 2022

(54) DIRECTIONALLY ORIENTED INTERFACES AND SYSTEMS AND METHODS FOR THE SAME

(71) Applicant: vSpatial, Inc., Provo, UT (US)

(72) Inventors: David Levon Swanson, Orem, UT (US); Jared William Schrock, Salt Lake City, UT (US)

(73) Assignee: vSpatial, Inc., Provo, UT (US)

( * ) Notice: Subject to any disclaimer, the term of this patent is extended or adjusted under 35 U.S.C. 154(b) by 0 days.

(21) Appl. No.: 16/271,613

(22) Filed: Feb. 8, 2019

(65) Prior Publication Data

US 2019/0250720 A1 Aug. 15, 2019

Related U.S. Application Data

(60) Provisional application No. 62/628,486, filed on Feb. 9, 2018.

(51) Int. Cl.
*G09G 5/00* (2006.01)
*G06F 3/02* (2006.01)
*G06F 3/023* (2006.01)
*G06F 3/01* (2006.01)
*G06F 3/04886* (2022.01)

(52) U.S. Cl.
CPC ............ *G06F 3/0236* (2013.01); *G06F 3/011* (2013.01); *G06F 3/04886* (2013.01)

(58) Field of Classification Search
CPC .......... G06F 3/017; G06F 3/011; G06F 3/013
See application file for complete search history.

(56) References Cited

U.S. PATENT DOCUMENTS

| 2007/0103430 | A1* | 5/2007 | Nishi | G06F 3/014 |
| | | | | 345/156 |
| 2011/0071818 | A1* | 3/2011 | Jiang | G06F 3/0236 |
| | | | | 704/8 |
| 2015/0160856 | A1* | 6/2015 | Jang | G06F 3/04842 |
| | | | | 715/773 |
| 2016/0267200 | A1* | 9/2016 | Guo | G06F 16/90328 |
| 2016/0299569 | A1* | 10/2016 | Fisher | G02B 27/017 |
| 2017/0206004 | A1* | 7/2017 | De Bruyn | G06F 17/2223 |

* cited by examiner

*Primary Examiner* — Nan-Ying Yang
(74) *Attorney, Agent, or Firm* — TraskBritt

(57) ABSTRACT

Disclosed embodiments relate, generally, to directionally oriented keyboards for interfacing with a virtual workspace, including applications executing therein, and related systems, methods, and devices. A selectable object of an invoked directionally oriented keyboard may be selected responsive to directional information. Directional information may be provided by a user input device such as a thumbstick device or video capture device. A selectable object and/or information associated with the selectable object may be provided to a business application that is associated with an invoked directionally oriented keyboard.

20 Claims, 13 Drawing Sheets
(4 of 13 Drawing Sheet(s) Filed in Color)

DIRECTIONALLY ORIENTED INTERFACES AND SYSTEMS AND METHODS FOR THE SAME

CROSS-REFERENCE TO RELATED APPLICATION

This application claims the benefit under 35 U.S.C. § 119(e) of U.S. Provisional Patent Application Ser. No. 62/628,486, filed Feb. 9, 2018, the entire contents and disclosure of which is hereby incorporated herein by this reference.

TECHNICAL FIELD

The embodiments of the present disclosure generally relate to interfaces that may be used in virtual reality environments, and more specifically, in certain embodiments, directionally oriented keyboards.

BACKGROUND

Conventional virtual reality environments may be used to mimic the physical objects, functions and behavior of conventional a physical computer workspace. Some virtual reality engines use different systems to interface with a virtual environment, for example, gloves, wands, and thumbsticks. The particular interface is used with the virtual workspace that is generated by the virtual reality engine.

Conventional virtual reality interfaces may map to a typical point and click type interface used with conventional graphical user interfaces on physical displays. A user moves a cursor over a simulated keyboard and "clicks" (pushes a button, waves a hand, etc.) to select a key. Other conventional virtual reality interfaces may create virtual hands that may interact with the simulated objects (e.g., a "floating" keyboard and/or mouse) in the virtual reality, and a user may operate the virtual hands by moving his/her physical hands.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The purpose and advantages of the embodiments of the disclosure will be apparent to one of ordinary skill in the art from the summary in conjunction with the detailed description and appended drawings that follow.

DETAILED DESCRIPTION

Figure 1A:
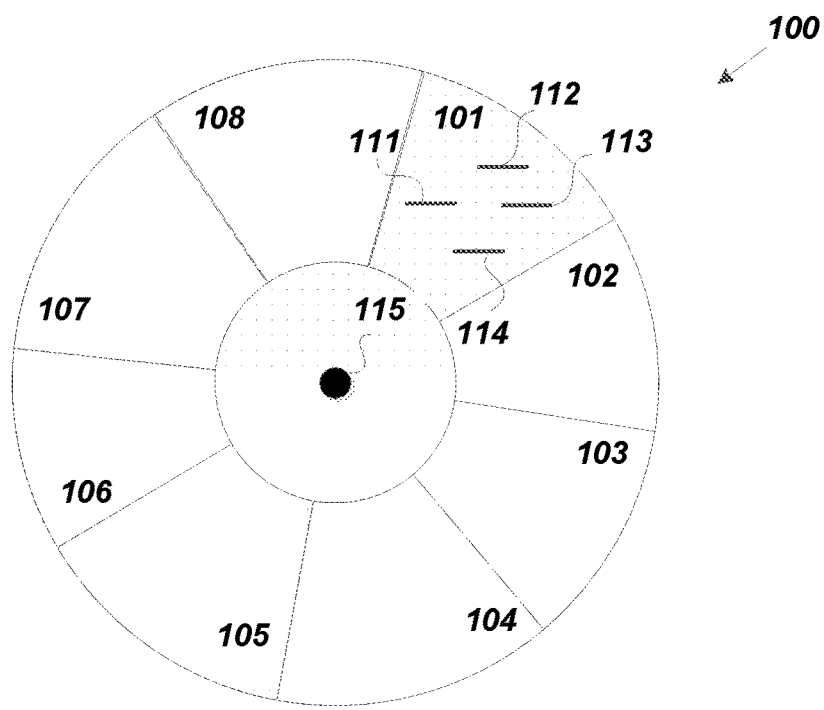
FIG. 1A shows a graphical user interface of a directionally oriented interface, in accordance with an embodiment of the present disclosure.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure. The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments.

The following description may include examples to help enable one of ordinary skill in the art to practice the disclosed embodiments. The use of the terms "exemplary," "by example," "for example," "e.g.," and the like means that the related description is explanatory, and though the scope of the disclosure is intended to encompass the examples and legal equivalents, the use of such terms is not intended to limit the scope of an embodiment or this disclosure to the specified components, steps, features, functions, or the like.

Thus, specific implementations shown and described are only examples and should not be construed as the only way to implement the present disclosure unless specified otherwise herein. Elements, circuits, modules, engines, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Elements described herein may include multiple instances of the same element. These elements may be generically indicated by a numerical designator (e.g., 110) and specifically indicated by the numerical indicator followed by an alphabetic designator (e.g., 110A) or an alpha-numeric indicator preceded by a "dash" (e.g., 110-1 or 110-J). For ease of following the description, for the most part element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

As used in the present disclosure, the terms "unit," "module," "engine," or "component" may refer to specific hardware implementations configured to perform the actions of the unit, module or component and/or software objects or software routines that may be stored on and/or executed by general purpose hardware (e.g., computer-readable media, processing devices, etc.) of a computing system. In some embodiments, the different units, components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

Various embodiments described herein relate to a fractal keyboard that may be used in a virtual reality (VR) office. The virtual "keys" are mapped to pre-determined directions in directional interface (e.g., a thumb-stick). A graphical user interface (GUI) may represent the fractal keyboard visually as well as the user interaction with the fractal keyboard. The fractal keyboard may be invoked and used with various applications, including business applications such as applications for word processing, spreadsheet, presentations, web-browsing, e-mail and appointments, design and development, gaming and more.

As used herein, "virtual reality" and its abbreviation, "VR," means a computer-generated simulation of a three-dimensional image or environment that may be interacted with in a seemingly real or physical way by a person using interface devices, such as a headset with a display screen, gloves, and/or a thumbstick device. Virtual reality may incorporate devices for visual, auditory, and sensory elements. Interface devices may incorporate sensors for gathering information about how a user interacts with a VR simulation, including one or more of head movement, eye movement, arm and hand movement, body position, body temperature, and more.

As used herein, "virtual reality" and its abbreviation, "VR," also included mixed-reality (which includes augmented-reality) simulations of three-dimensional images that "overlay" the real world. Such mixed-reality simulations may be interacted with, again, in a seemingly real or physical way by a person using interface devices, and/or using their body parts (head, hands, arms, legs) where movement is captured by cameras or other sensors associated with the headset or glasses that provide the simulated overlay of the mixed-reality.

FIG. 1A shows a GUI of a directionally oriented interface 100, in accordance with an embodiment of the disclosure. The directionally oriented interface 100 includes a number of segments, including panels 101-108. Each panel 101-108 may be selectable and may include one or more selectable objects. For example, panel 102 includes selectable objects 111, 112, 113, and 114. A directional indicator 115 is substantially at the center of the directionally oriented interface 100. The directional indicator 115 may be configured to point in any number of directions. In some embodiments, the directions may be pre-configured and may be associated with the number of selectable objects defined in the directionally oriented interface 100. In FIG. 1A, the directional indicator 115 is not pointing in any direction and is represented as a dot in the center of the directionally oriented interface 100.

Figure 1B:
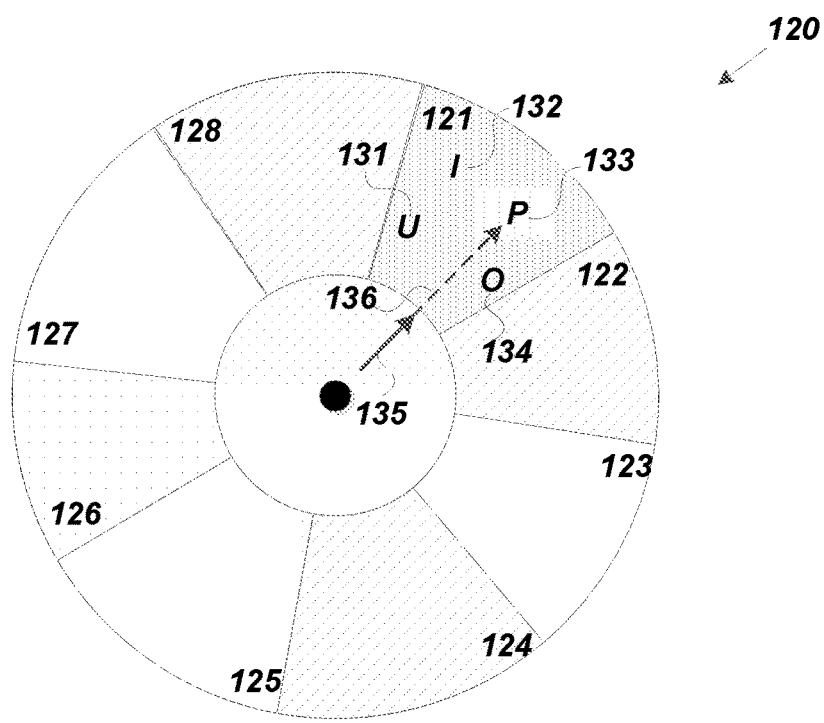
FIG. 1B shows a graphical user interface of a directionally oriented keyboard, in accordance with an embodiment of the present disclosure.

FIG. 1B shows a GUI of a directionally oriented keyboard 120, in accordance with an embodiment of the disclosure. The directional indicator 135 has been invoked (e.g., responsive to a user interface device) and is pointing toward panel 121 and a selectable object 133 (the letter "P") of selectable objects 131-134. In various embodiments, the selectable objects may comprise letters and other keyboard functions found on keyboard layouts such as a Dvorak, QWERTY, AZERTY, QWERTZ, HCESAR, MEMBRANE, or combinations thereof. The direction 136 is associated with the letter "P," and other directions (not shown) may be associated with the other selectable objects 131, 132, and 134. Different systems may be used to represent the direction 136, for example, an angle on a 360° full rotation, a position identifier, length/distance (e.g., by pixel or simulated distance), etc. The panel 121 is shaded a darker grey than the other panels 121-128 and the shading may be a visual indicator of a grouping of selectable objects (here, the letters "I," "U," "O," and "P") toward which the directional indicator 135 points. The letter "P" and area around it is shaded a lighter grey than the rest of the panel 121 and the shading may be a visual indicator that the letter "P" is associated with the direction 136, responsive to the directional indicator 135 being invoked in the direction 136 by a user interface device.

In some embodiments, haptic feedback may be integrated with the directionally oriented keyboard 120. In such embodiments, haptic feedback may be provided to a user interface device responsive to the directional indicator 135 being invoked in each direction. By way of non-limiting example, haptic feedback may be generated responsive to an initial selection of a direction, a change in direction, selection of an object, etc.

FIGS. 1A and 1B show one example of a GUI for a directionally oriented interface, but other layouts are specifically contemplated, and the GUI need not be circular. For example, the GUI may be a polygon, a semi-circle, or may have no outer boundary defining a specific shape.

Figure 1C:
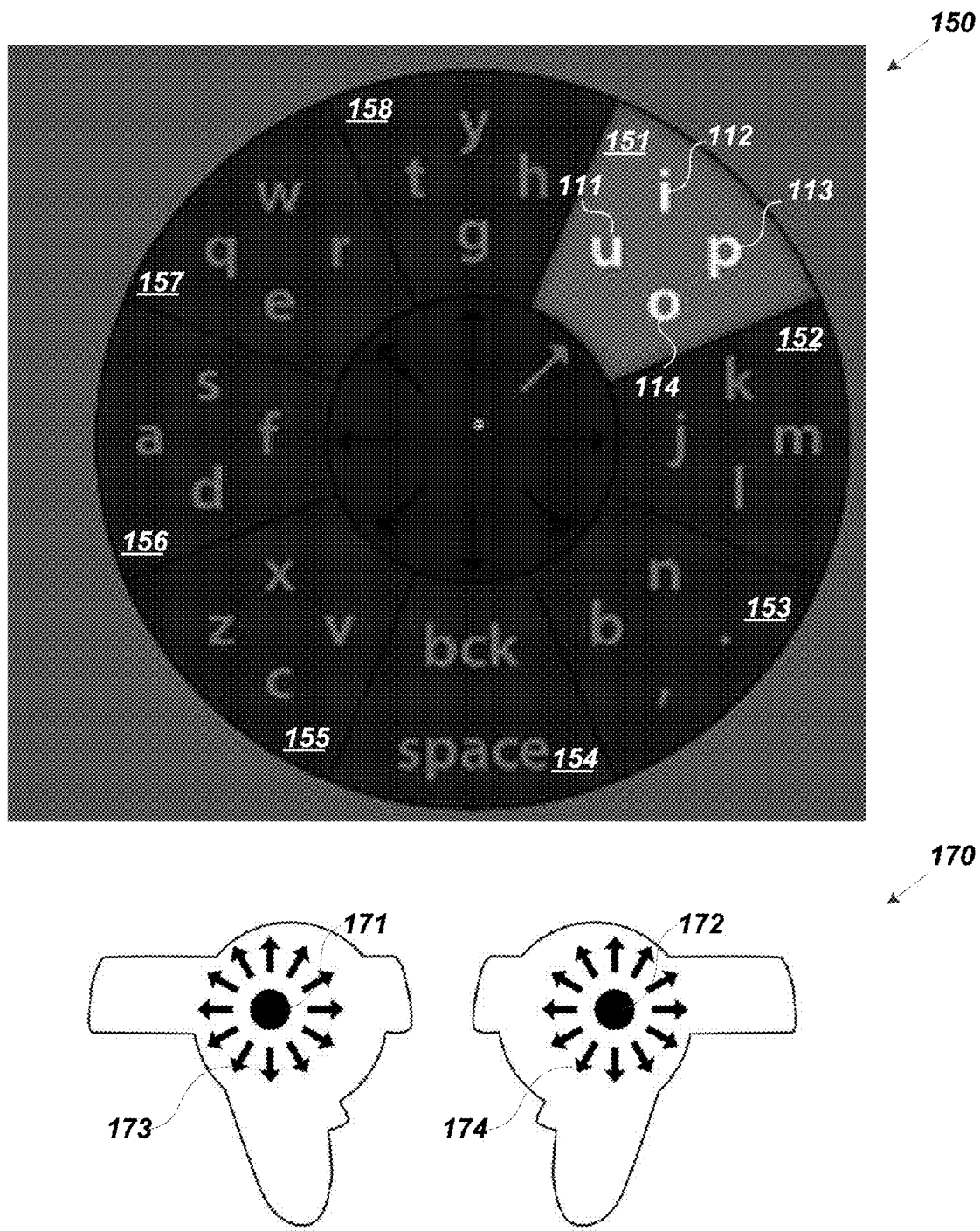
FIG. 1C shows a graphical user interface of a directionally oriented keyboard, in accordance with an embodiment of the present disclosure.

FIG. 1C shows a directionally oriented keyboard 150 including the keys of a conventional keyboard, in accordance with an embodiment of the disclosure. FIG. 1C also shows thumbstick input devices 170 configured to generate directional information responsive to movement of the thumbsticks 171 and 172 in the directions 173 and 174. In one embodiment, directional information from thumbstick 171 and directional information for thumb stick 172 may be associated with different groups of selectable objects. In another embodiment, directional information from thumbstick 171 may be associated with one or more panels 151-158, and directional information from thumbstick 172 may be associated with one or more selectable objects in each panel. The thumbstick input device 170 may include additional buttons, including trigger-type buttons that may indicate a user selection of a selectable object, for example, a selectable object associated with a direction indicated by the thumb stick 172.

In other embodiments, d-pad input devices may be used instead of, or in additional to, thumbstick input devices.

Figure 2:
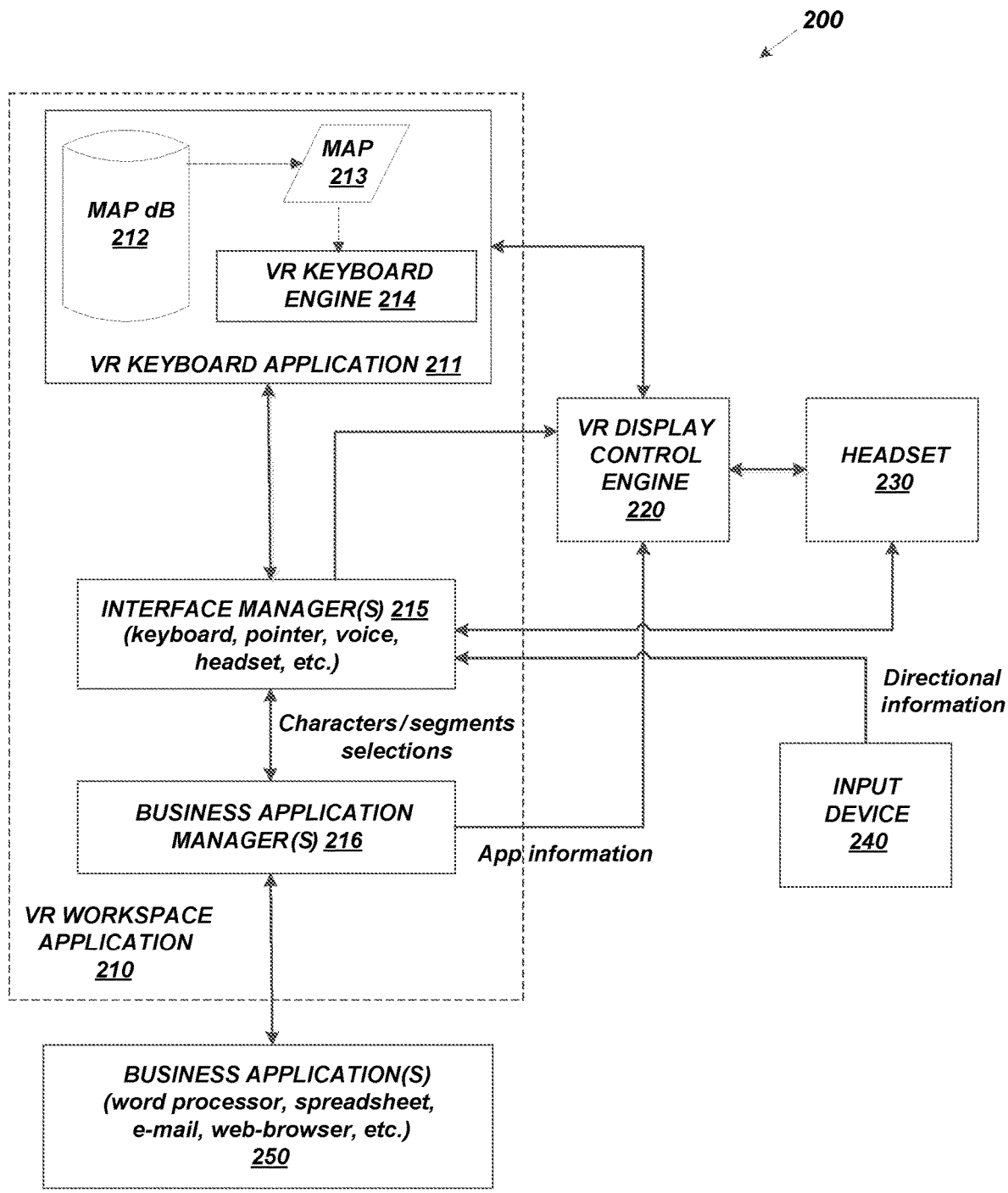
FIG. 2 shows a system that provides a directionally oriented interface in a virtual reality environment, in accordance with an embodiment of the present disclosure.

FIG. 2 shows a system 200 that provides a directionally oriented interface in a VR environment, such as the directionally oriented keyboard 120, in accordance with an embodiment of the disclosure. The system 200 may include a VR workspace application 210, a VR display control engine 220, headset 230, an input device 240, and one or more business applications 250.

The VR workspace application 210 may provide a virtual workspace to a user of the headset 230. The virtual workspace may provide a virtual computer, virtual monitors, objects for manipulation, virtual meeting rooms, and more. The VR workspace application 210 may allow a user to call and run various business applications 250. The business application 250 may include applications for word processing, spreadsheets, presentations, web-browsing, e-mail, and more.

The VR workspace application 210 may include a VR keyboard application 211, one or more interface manager(s) 215, and one or more business application manager(s) 216. In various embodiments, the VR keyboard application 211 may manage and store definitions/maps 213 for directionally oriented keyboards. The VR keyboard application 211 may provide the maps 213 and/or other elements to the VR display control engine 220, which uses the maps to control display of a directionally oriented keyboard 120 at the headset 230. The VR keyboard application 211 may also provide the maps 213 and/or other elements to interface manager(s) 215, which use the maps to interpret directional information received from an input device 240.

In the embodiment shown in FIG. 2, the VR keyboard application 211 is incorporated into the VR workspace application 210. In other embodiments, the VR keyboard application 211 may be a device driver for a virtual keyboard associated with VR headset, such as headset 230. Such a driver may include application programming interfaces (APIs) that may be called, for example, by a virtual reality engine. In yet other embodiments, the VR keyboard application 211 may be incorporated into an operating system (OS), such as a WINDOWS® based OS, a MAC® OS, a UNIX based OS, an ANDROID® based OS, or another OS. In yet other embodiments, the VR keyboard application 211 may be incorporated into a VR overlay application.

The interface manager(s) 215 may manage input and output with various interface devices, such as VR headsets, physical keyboards, thumbstick devices, point-and-click devices, microphones, etc. The interface manager(s) 215 may communicate with one or more business application manager(s) 216 and interface between the business application manager(s) 216 and the VR display control engine 220. In various embodiments, the interface manager(s) 215 may provide information to the VR display control engine 220 that may be used to generate a virtual workspace and that allows a user to interact, via the virtual workspace environment with the business application(s) 250.

The business application manager(s) 216 may manage the various business application(s) 250 that a user may interact with via a virtual workspace, including calling the applications and using the applications.

Figure 3:
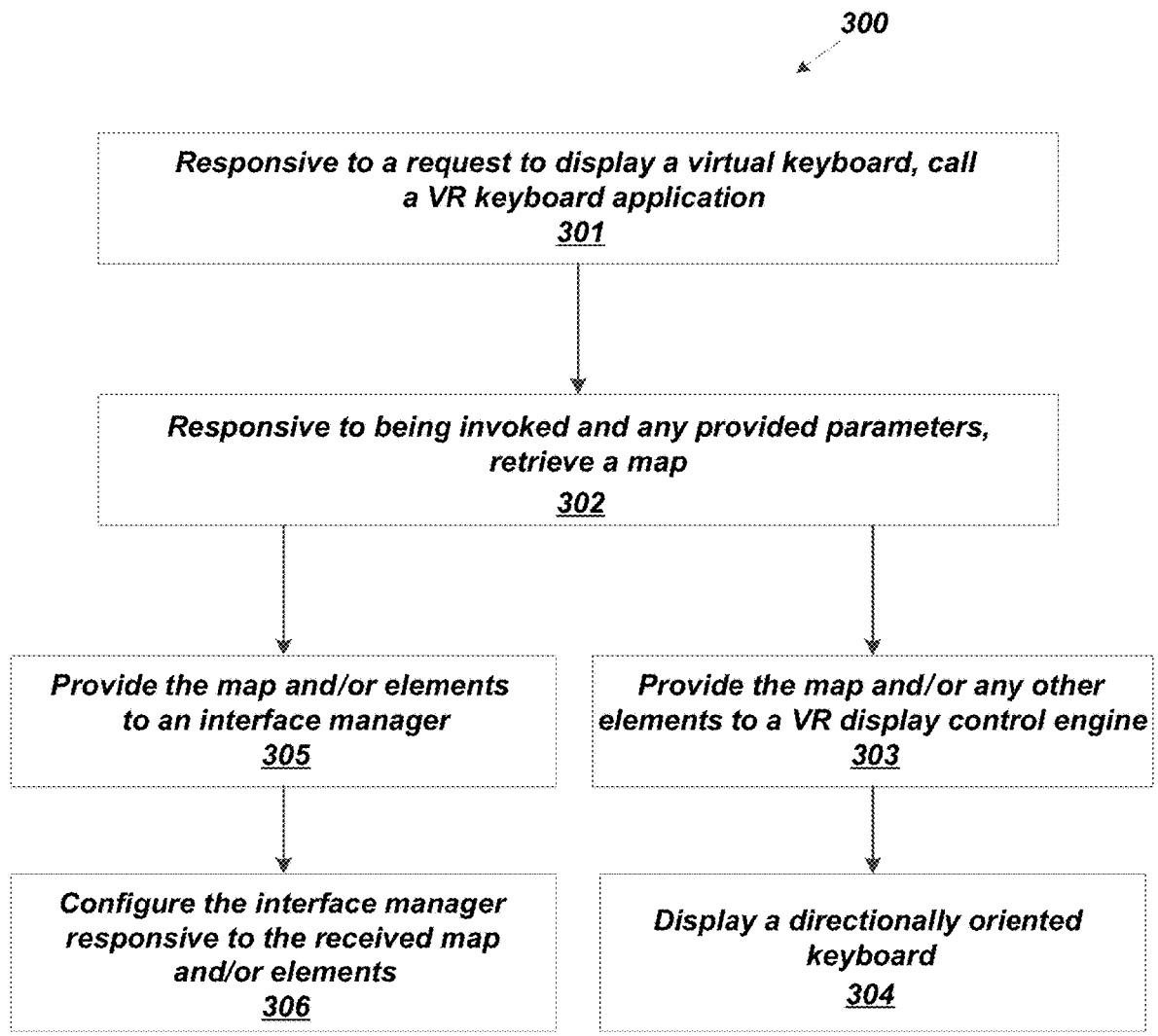
FIG. 3 shows a process for invoking a directionally oriented keyboard, such as the directionally oriented keyboard shown in FIG. 1C, in accordance with an embodiment of the present disclosure.

FIG. 3 shows a process 300 for invoking a directionally oriented keyboard, such as the directionally oriented keyboard 150 shown in FIG. 1C, in accordance with an embodiment of the present disclosure. Responsive to a request to display a virtual keyboard, the interface manager(s) 215 call the VR keyboard application 211, in operation 301. In one embodiment, the interface manager(s) 215 may instantiate an interface manager specifically for the directionally oriented keyboard. The VR keyboard engine 214 receives the request (and/or parameter associated with the virtual keyboard—e.g., type, function, constraints related to a business application 250, etc.) to invoke the directionally oriented keyboard and retrieves the map 213 from the Map dB 212 responsive to the request, in operation 302. The VR keyboard application 211 provides the map 213 and/or any other elements to the VR display control engine 220, in operation 303. The VR display control engine 220 controls display of the directionally oriented keyboard at the headset 230, in operation 304. The VR keyboard engine 214 provides the map 213 and/or other elements to the interface manager(s) 215, in operation 305. The interface manager(s) 215 is/are configured responsive to the received map, in operation 306.

Figure 4A:
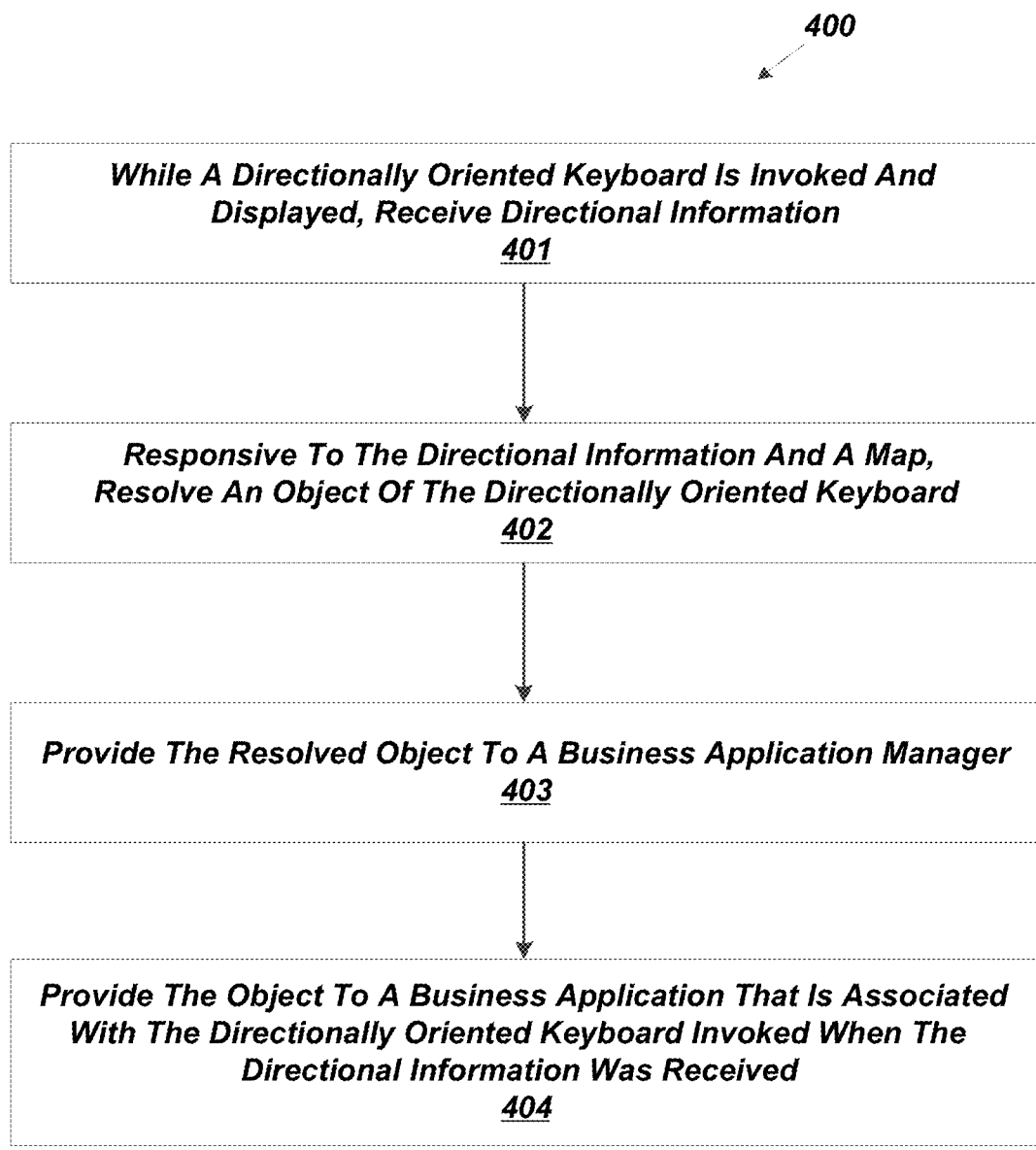
FIG. 4A shows a process for selecting an object in a directionally oriented keyboard, such as the directionally oriented keyboard shown in FIG. 1C, in accordance with an embodiment of the present disclosure.

FIG. 4A shows a process 400 for selecting an object in a directionally oriented keyboard, such as the directionally oriented keyboard 150 shown in FIG. 1C, in accordance with an embodiment of the present disclosure. While a directionally oriented keyboard 150 is invoked and displayed at the headset 230, directional information from the input device 240 is received at the interface manager(s) 215, in operation 401. The interface manager(s) 215, responsive to the directional information and the map 213, resolve an object (here, a letter) of the directionally oriented keyboard 150, in operation 402. The interface manager(s) 215 provide the selected object (i.e., letter) to the business application manager(s) 216, in operation 403. The business application manager(s) 216 provide the selected object to business application(s) 250 that is associated with the invoked directionally oriented keyboard, in operation 404.

Figure 4B:
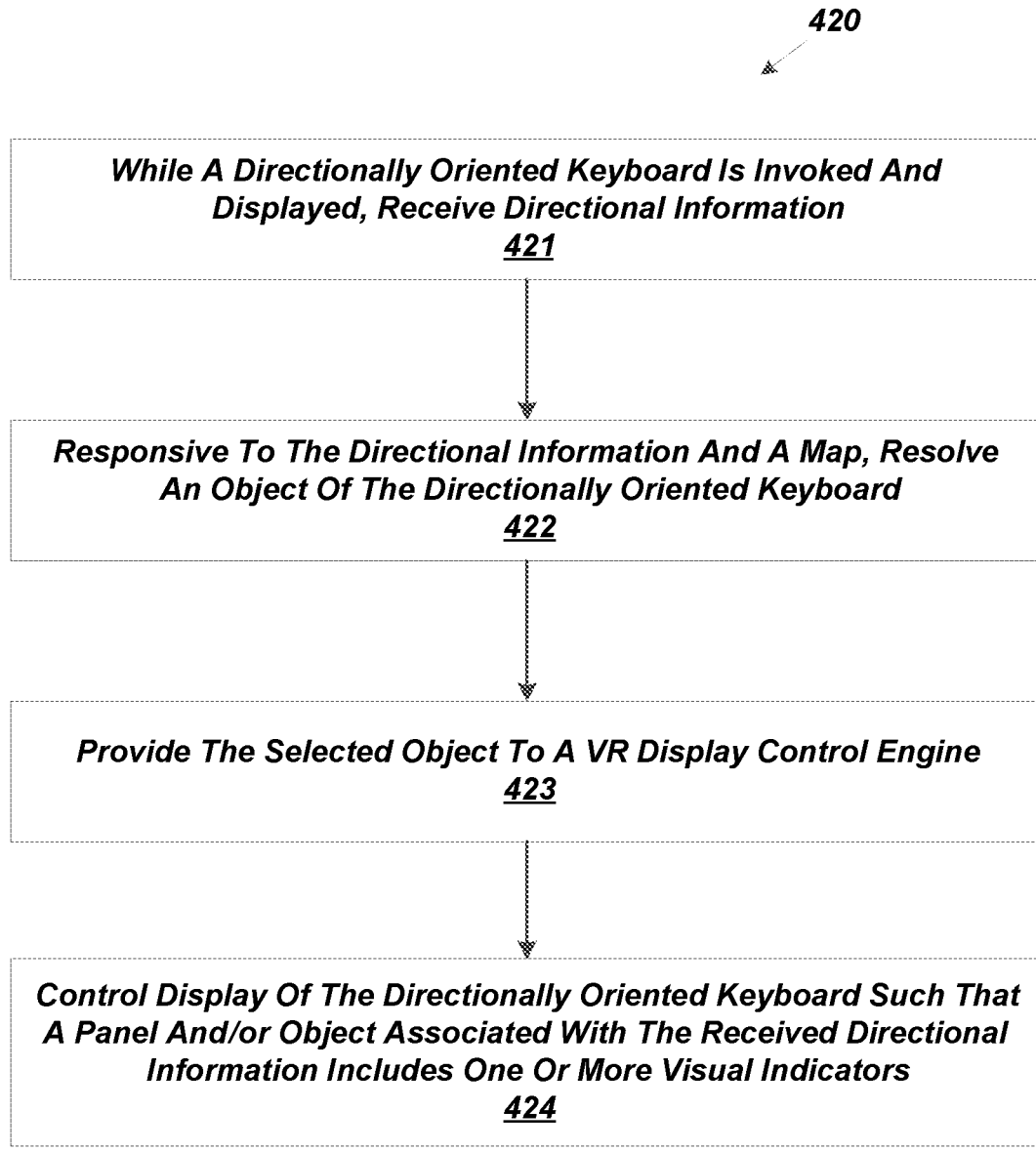
FIG. 4B shows a process for selecting an object in a directionally oriented keyboard, such as the directionally oriented keyboard shown in FIG. 1C, in accordance with an embodiment of the present disclosure.

FIG. 4B shows a process 420 for selecting an object in a directionally oriented keyboard, such as the directionally oriented keyboard 150 shown in FIG. 1C, in accordance with an embodiment of the present disclosure. While a directionally oriented keyboard 150 is invoked and displayed at the headset 230, directional information from the input device 240 is received at the interface manager(s) 215, in operation 421. The interface manager(s) 215, responsive to the directional information and the map 213, resolve an object (here, associated with a letter) of the directionally oriented keyboard 150, in operation 422. The interface manager(s) 215 provide the selected object (or information associated with the object, e.g., a letter) to the VR display control engine 220, in operation 423. The VR display control engine 220 controls the display of the directionally oriented keyboard at the headset such that a panel and/or object associated with the received directional information includes one or more visual indicators (such as the shading shown in FIG. 1B and FIG. 1C), in operation 424.

Figure 4C:
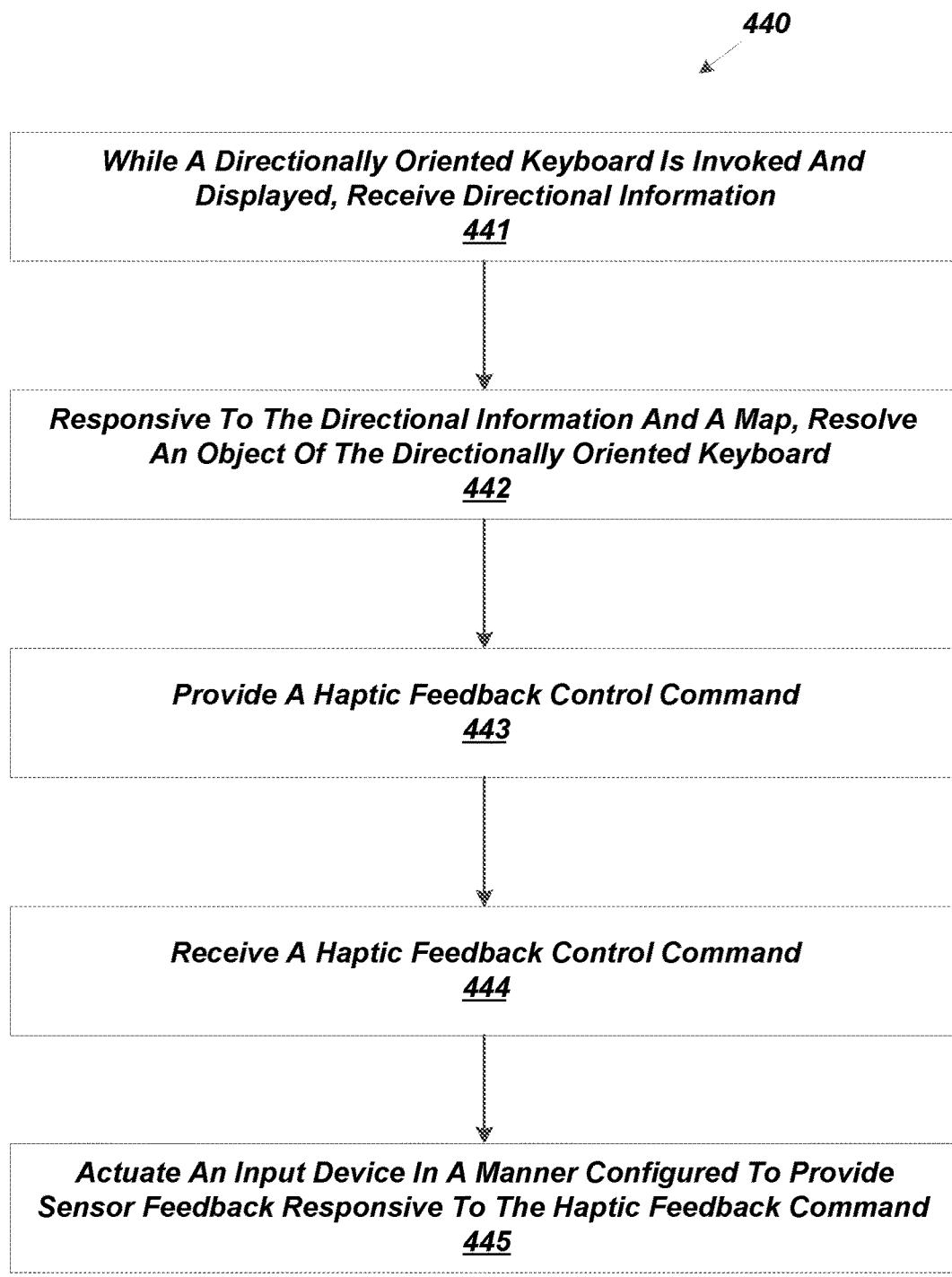
FIG. 4C shows a process for selecting an object in a directionally oriented keyboard, such as the directionally oriented keyboard shown in FIG. 1C, in accordance with an embodiment of the present disclosure.

FIG. 4C shows a process 440 for selecting an object in a directionally oriented keyboard, such as the directionally oriented keyboard 150 shown in FIG. 1C, in accordance with an embodiment of the present disclosure. While a directionally oriented keyboard 150 is invoked and displayed at the headset 230, directional information from the input device 240 is received at the interface manager(s) 215, in operation 441. The interface manager(s) 215, responsive to the directional information and the map 213, resolve an object (here, a letter) of the directionally oriented keyboard 150, in operation 442. For example, the object may represent an initial selection or a change in selection (e.g., change in direction of a directional indicator). The interface manager(s) 215 provides a haptic feedback control command to the input device 240, in operation 443, and the input device 240 receives the haptic feedback control command, in operation 444. The haptic feedback control command may comprise, among other things, a force and duration, or may include identifiers or values indicative of a force and duration. An actuator (not shown) at the input device 240, responsive to the received haptic feedback command vibrates in a manner configured to provide sensory feedback to a user of the input device 240, in operation 445.

Figure 5A:
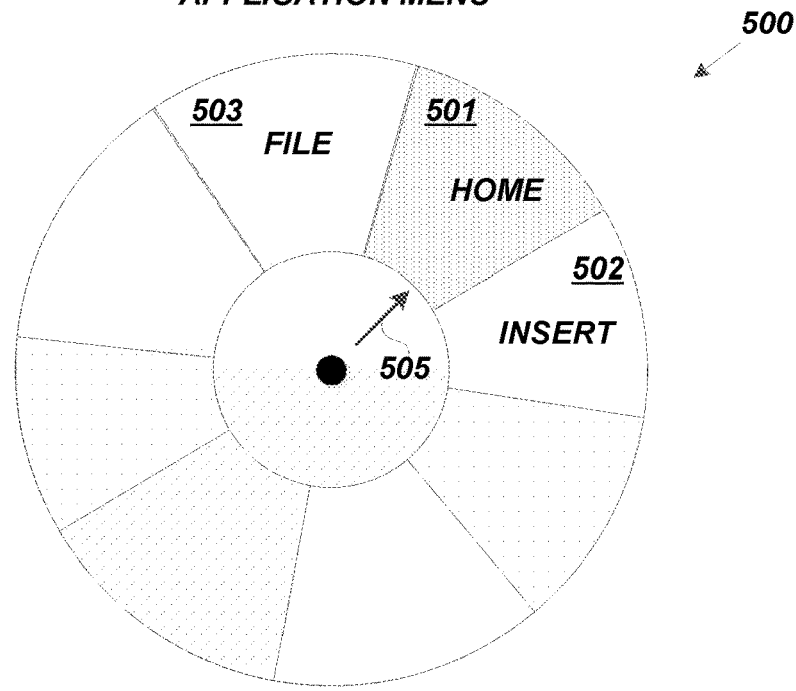
FIGS. 5A and 5B show a layout of a graphical user interface representing directionally oriented menus, in accordance with an embodiment of the present disclosure.
Figure 5B:
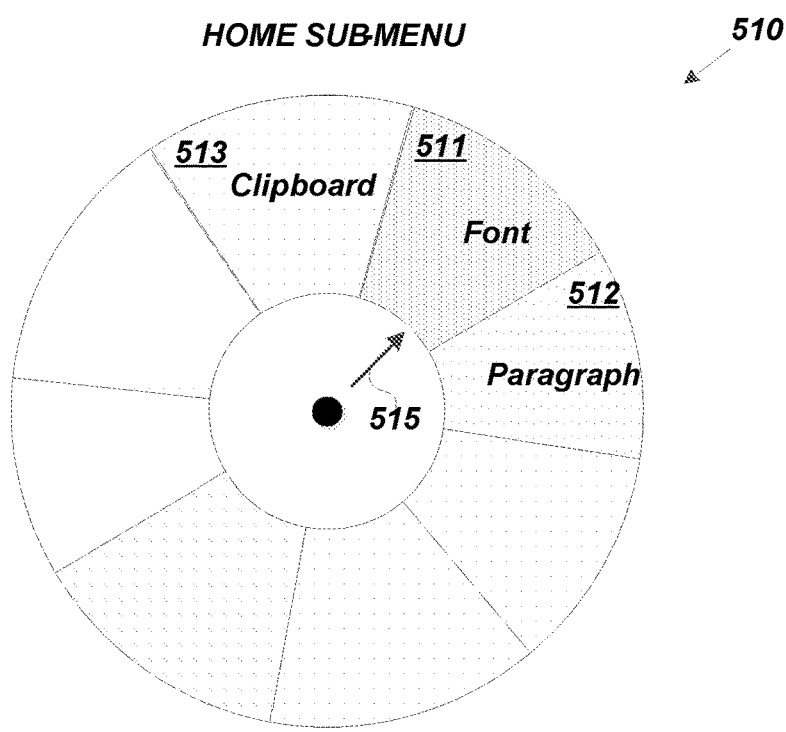

FIGS. 5A and 5B show a layout of GUI's representing directionally oriented menus, in accordance with an embodiment of the present disclosure. FIG. 5A shows a directionally oriented menu 500 that includes a number of panels associated with menu items of a word processing application, including panels 501, 502 and 503. In FIG. 5A, the directional indicator 505 points to panel 501, which is associated with menu item "HOME." If the panel 501 is selected, a directionally oriented sub-menu 510 is displayed, for example, replacing the menu 500 or in the proximity of menu 500. FIG. 5B shows a sub-menu 510 associated with the "HOME" menu item, and may include a number of panels associated with sub-menu items of the "HOME" menu item, including 511, 512, and 513. In FIG. 5B, the directional indicator 515 points to panel 511 and sub-menu item "Font," which may be selected.

In the case of directionally oriented menus and sub-menus, the menu structure may be stored in the business applications 250. The menu-structure may also be stored in a GUI definition of an OS, for example, a MAC® OS.

Figure 5C:
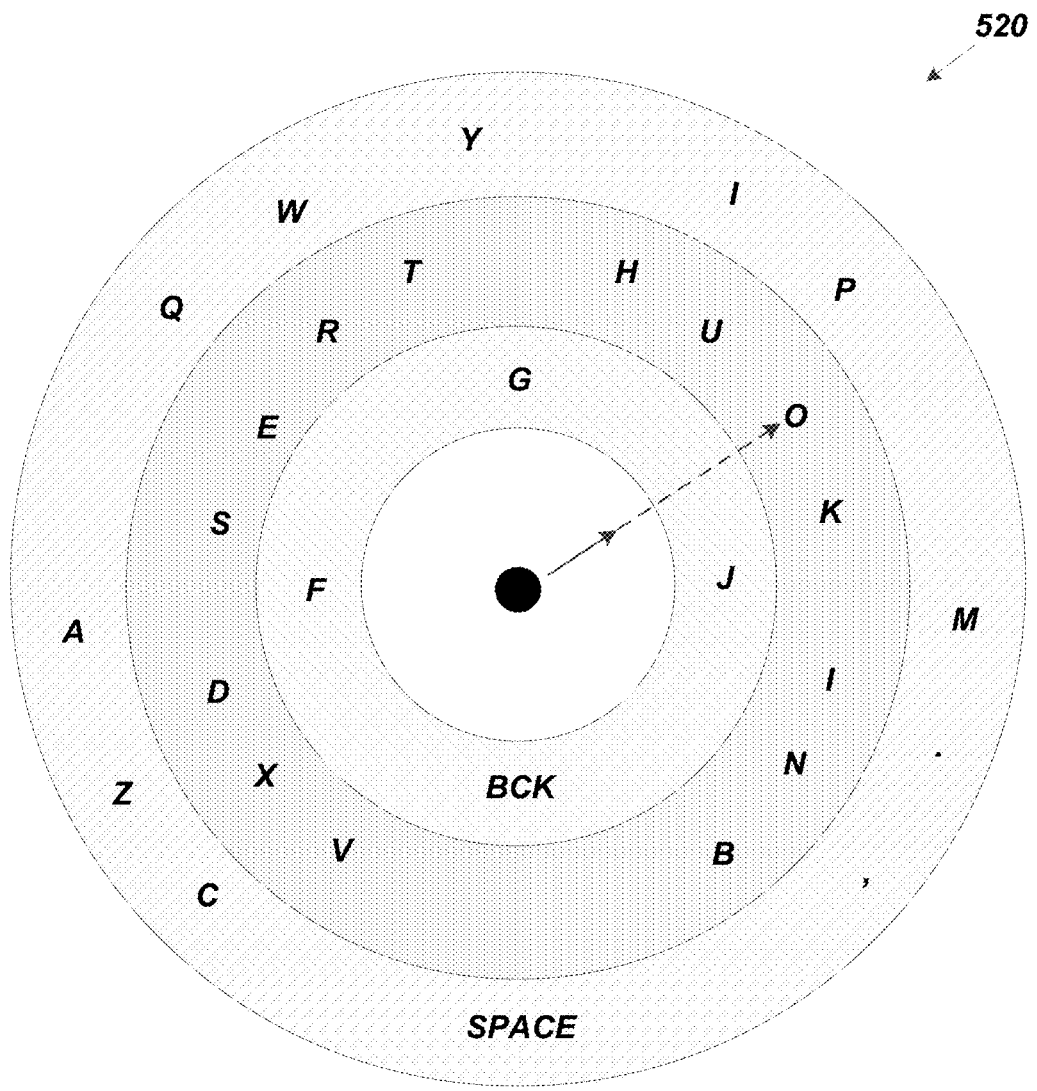
FIG. 5C shows an alternative layout of a graphical user interface representing a directionally oriented keyboard, in accordance with an embodiment of the present disclosure.

FIG. 5C shows an alternative layout of a GUI representation of a directionally oriented keyboard 520, in accordance with an embodiment of the present disclosure. The selectable objects (e.g., letters and other keyboard functions) are arranged in concentric regions.

Figure 6A:
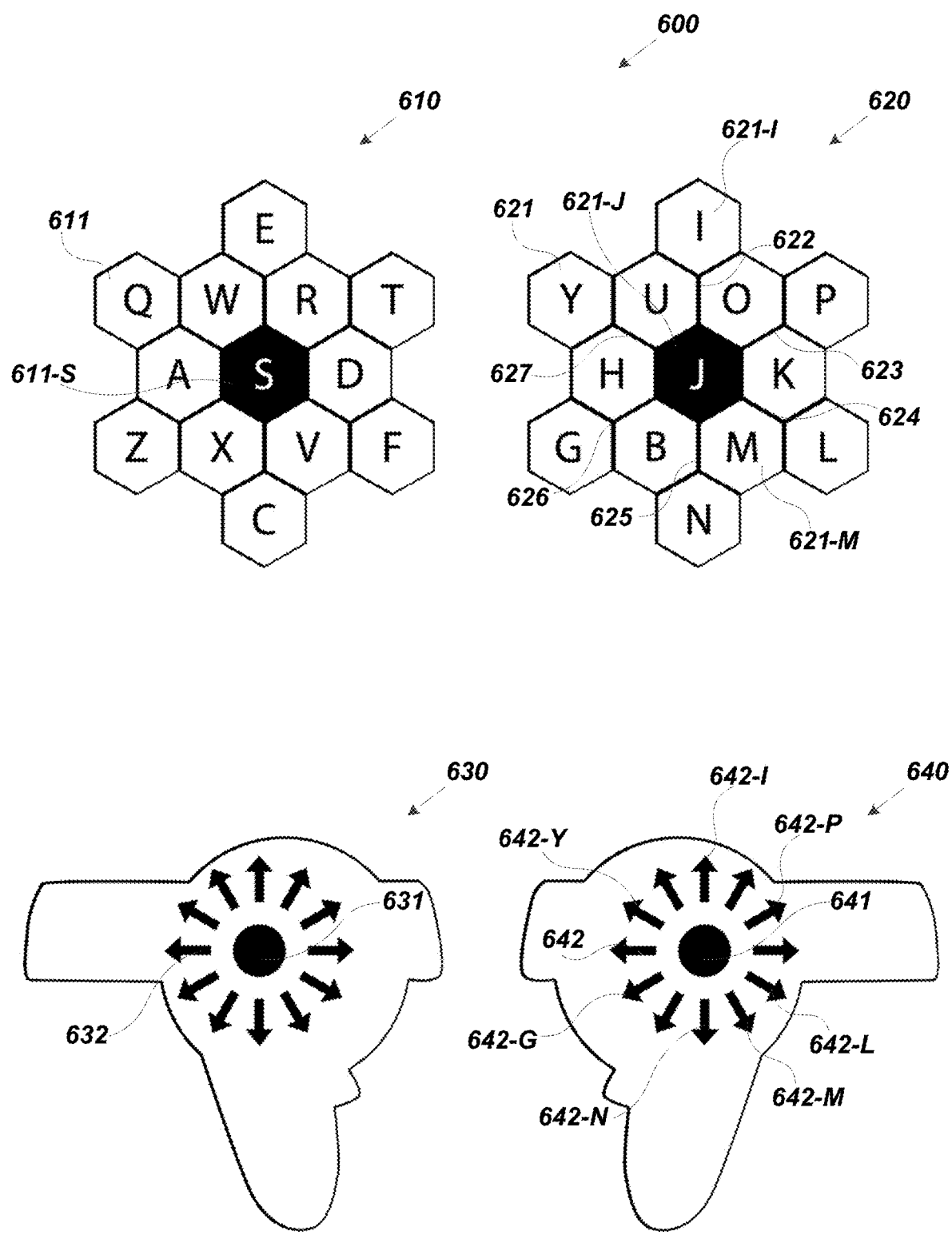
FIG. 6A shows a directionally oriented keyboard including fractal keyboards, in accordance with an embodiments of the disclosure.

FIG. 6A shows a directionally oriented keyboard 600, in accordance with one or more embodiments of the disclosure. In one or more embodiments, directionally oriented keyboard 600 may include one or more directionally oriented sub-keyboards, here, fractal keyboard 610 and fractal keyboard 620. In the embodiment shown in FIG. 6A, fractal keyboards 610 and 620 include hexagonally-grouped selectable objects. More specifically, with reference to fractal keyboard 610 (but equally applicable to fractal keyboard 620), a selectable object 611-S is centrally located in fractal keyboard 610, and other selectable objects 611 are positioned around and outward from selectable object 611-S in a pattern characterized by hexagonal grouping (i.e., an alternative fractal pattern). In this example, respective selectable objects 611 have a hexagonal shape. In the embodiment of fractal keyboards 610 and 620 shown in FIG. 6A, the pattern of selectable objects is symmetrical to the keyboards themselves as well as symmetrical across both keyboards, however, in other embodiments a different number of selectable objects may be grouped such that the pattern of selectable objects is not symmetrical.

In one or more embodiments, selectable objects 611 and 621 of fractal keyboards 610 and 620, respectively, may be associated with characters, symbols, functions, and other elements associated with keys of conventional and non-conventional keyboards. Here, selectable objects 611 and 621 of fractal keyboards 610 and 620, respectively, are associated with, and display, respective letters of the English alphabet, and together the selectable objects 611-S, 611, 621-J, and 621 are associated with and display all letters (i.e., all 26 letters) of the English alphabet.

In one or more embodiments the system shown in FIG. 6A may also include thumbstick type input devices 630 and 640, which are configured to generate directional information responsive to movement of the thumbsticks 631 and 641 in one or more of directions 632 and 642. In one or more embodiments, input devices 630 and 640 may be associated with different respective sub-keyboards of directionally oriented keyboard 600. In the embodiment shown in FIG. 6A, input device 630 is associated with fractal keyboard 610 and input device 640 is associated with fractal keyboard 620. Fractal keyboard 610 and fractal keyboard 620 are displayed simultaneously, and controllable by input device 630 and input device 640, respectively.

In one embodiment, directional information from thumbstick 631 and directional information for thumbstick 641 may be associated with different selectable objects 611 and 621 and/or groups of selectable objects 611 and 621 of fractal keyboard 610 and fractal keyboard 620, respectively. More specifically, with reference to fractal keyboard 620 (but equally applicable to fractal keyboard 610), each direction 642 may be associated with a different selectable object 621 of fractal keyboard 620. For example, direction 642-I may be associated with selectable object 621-I, which is associated with the letter "I," direction 642-M may be associated with selectable object 621-M, which is associated with the letter "M," and so forth.

In another embodiment, directional information from thumbstick 631 may be associated with one or more selectable objects 611 and, and directional information from thumbstick 641 may be associated with one or more selectable objects 621. Thumbstick type input devices 630 and 640 may include additional buttons, including trigger-type buttons and/or a depressible thumbstick that, when activated, indicate a user selection of a selectable object, for example, a selectable object 611 associated with a direction indicated by thumbstick 631.

In one or more embodiments, some edges of selectable objects 611 and 621 align visually with directions 632 and 642, respectively. More specifically, and again with reference to fractal keyboard 620 (but equally applicable to fractal keyboard 610), in the embodiment shown in FIG. 6A, edge 622 aligns with direction 642-I, edge 623 aligns with direction 642-P, edge 624 aligns with direction 642-L, edge 625 aligns with direction 642-N, edge 626, aligns with direction 642-G, and edge 627 aligns with direction 642-Y. Visually aligned edges 622, 623, 624, 625, 626 and 627 assist a user with selecting a direction to move thumbstick 641 to select a selectable objects 621, and more specifically to select a selectable object 621 that is not immediately adjacent a centrally located selectable object, here, selectable object 621-J.

In one or more embodiments, selectable objects 611-S and selectable object 621-J are associated with a null or no-direction of directions 632 and 642, respectively. By way of example, to select selectable objects 611-S or selectable object 621-J, thumbstick 631 and thumbstick 641 are not moved or urged toward any direction. In other words, selectable objects 611-S and 621-J may be considered automatically selected or default selections.

In one or more embodiments, a visual indication such as shading of selectable objects 611-S and 621-J may be presented at fractal keyboards 610 and 620, respectively, automatically. If directional information is received that is associated with a different selectable object then that different selectable object may be displayed with a visual indicator (e.g., shading).

In one or more embodiments, directionally oriented keyboard 600 may present a sub-keyboard responsive to an activation request (e.g., from a button on one of input devices 630 and/or 640), and so it is specifically contemplated that during use one, both, or neither of fractal keyboard 610 and fractal keyboard 620 may be presented at any given time.

Figure 6B:
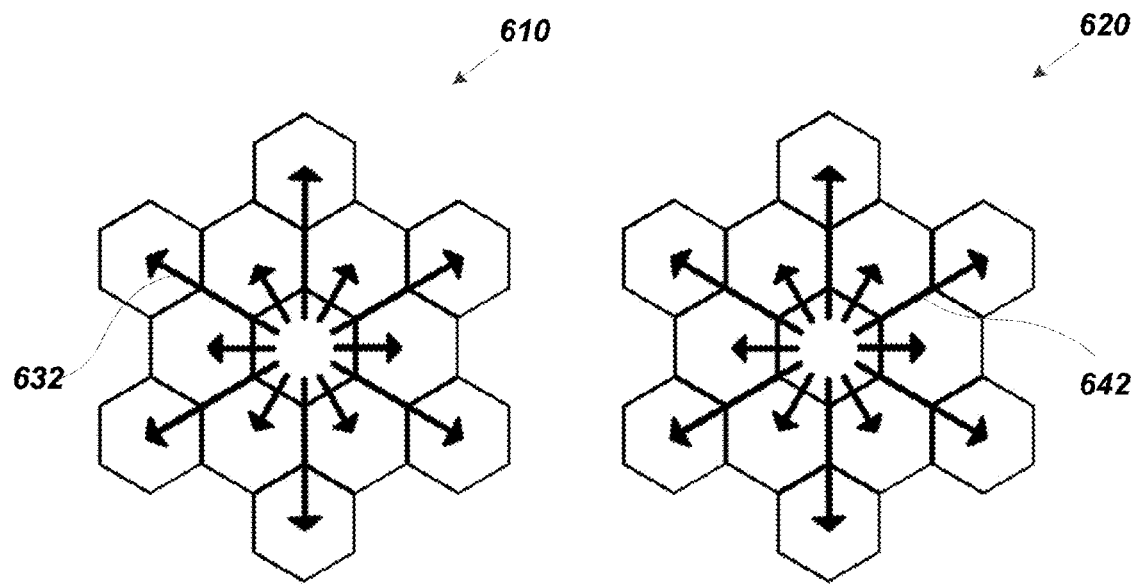
FIG. 6B shows an overlay of directions onto fractal keyboards, respectively, to illustrate alignment of directions with selectable objects, in accordance with one or more embodiments of the disclosure.

FIG. 6B shows an overlay of directions 632 and 642 onto fractal keyboard 610 and 620, respectively, to illustrate alignment of directions with selectable objects, in accordance with one or more embodiments of the disclosure.

Figure 6C:
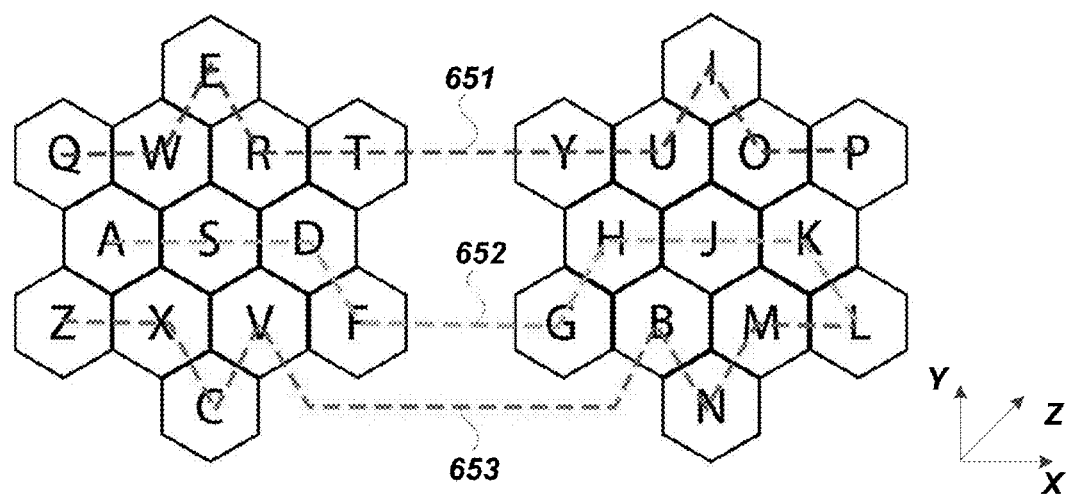
FIG. 6C shows an example of a key layout that corresponds to a QWERTY key layout standard, in accordance with one or more embodiments of the disclosure.

FIG. 6C shows how a key layout (i.e., which selectable objects are associated with which letters) corresponds to a QWERTY key layout standard, in accordance with one or more embodiments of the disclosure. Line 651 traverses selectable objects corresponding to Q, W, E, R, T, Y, U, I, O, and P, which in a QWERTY layout correspond to an upper row of keys. Line 652 traverses selectable objects corresponding to A, S, D, F, G, H, J, K, and L, which in a QWERTY layout correspond to a middle row of keys. Line 653 traverses selectable objects corresponding to Z, X, C, V, B, N, and M, which in a QWERTY layout correspond to a lower row of keys. So, in some embodiments, selectable objects traversed by line 651 may be characterized as an upper row of keys, selectable objects traversed by line 652 may be characterized as a middle row of keys, and selectable objects traversed by line 653 may be characterized as a lower row of keys. This disclosure is not limited to fractal keyboards or other directionally oriented keyboards that implement layouts that correspond to a QWERTY standard. Moreover, while selectable objects 611 and 621 of fractal keyboards 610 and 620, respectively, are shown arranged in horizontal rows (i.e., to an observer), rows of selectable objects may displayed at angles as if fractal keyboard 610 and/or 620 were rotated about the z-axis of the coordinate axis shown in FIG. 6C.

Figure 7:
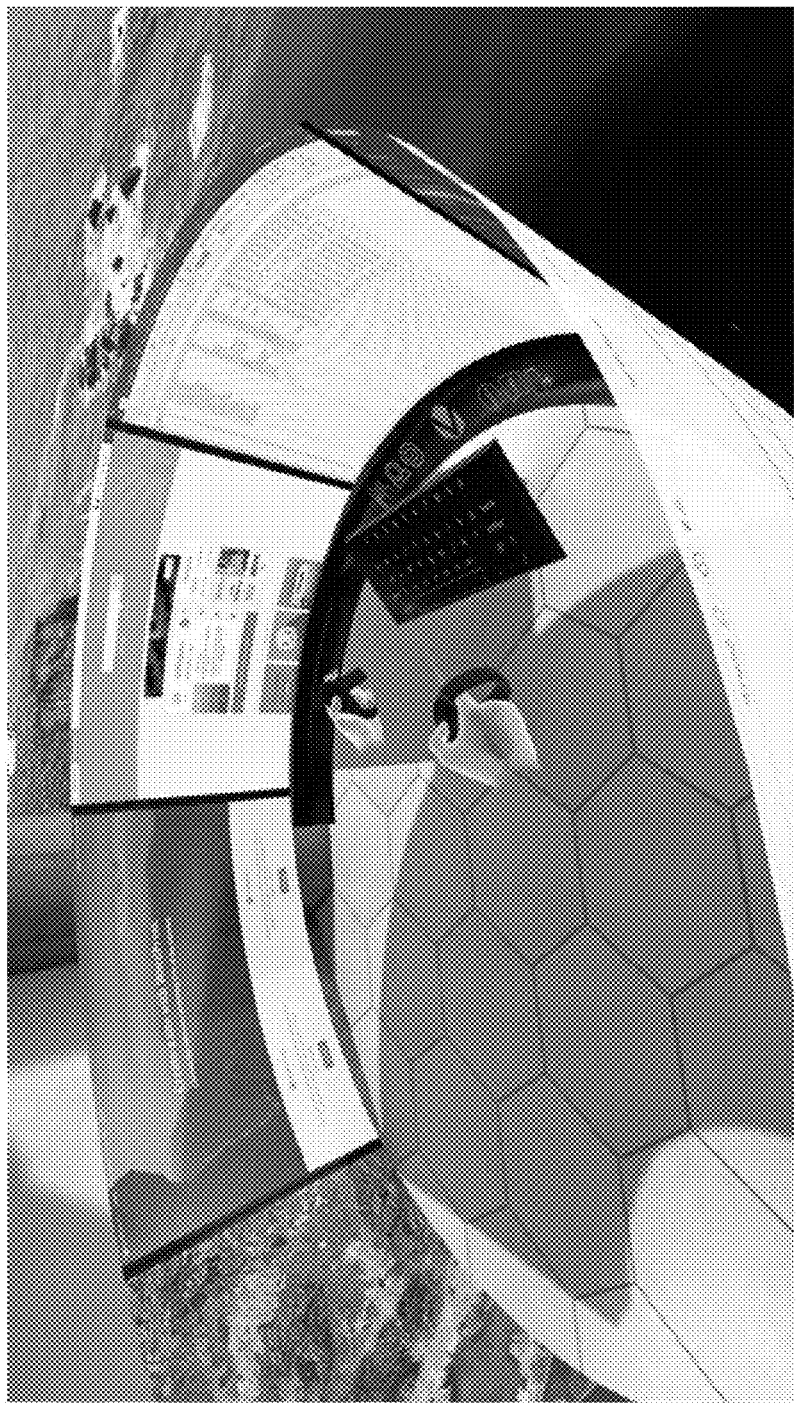
FIG. 7 shows a virtual workspace in accordance with an embodiment of the present disclosure.
Figure 7:

FIG. 7 shows a virtual workspace 700 in accordance with an embodiment of the present disclosure. The virtual workspace 700 may be managed by a VR workspace application 210 (FIG. 2) operating in conjunction with a VR display control engine 220 (FIG. 2). Various headsets 230 may be used with a virtual workspace 700, for example, the HTC VIVE®, OCULUS RIFT®, SONY PLAYSTATION HOME® VR, SAMSUNG GEAR VR®, and GOOGLE DAYDREAM VIEW®. It is also specifically contemplated that may be use with mixed-reality headsets (or headsets operating in a mixed-reality mode), for example, Microsoft HOLOLENS®.

A user may use an input device with a directional interface, such as the OCULUS TOUCH®, to interact with the virtual workspace 700. For example, if a directionally oriented keyboard has been invoked, then a user may utilize a directional interface of an input device to select objects on the directionally oriented keyboard. A user may move a thumbstick in a direction, and responsive to the movement in the direction one or more objects may be highlighted. A user may press a button or trigger to select an object and use that object or the information associated with the object with a business application, video game, or other software application.

Figure 8:
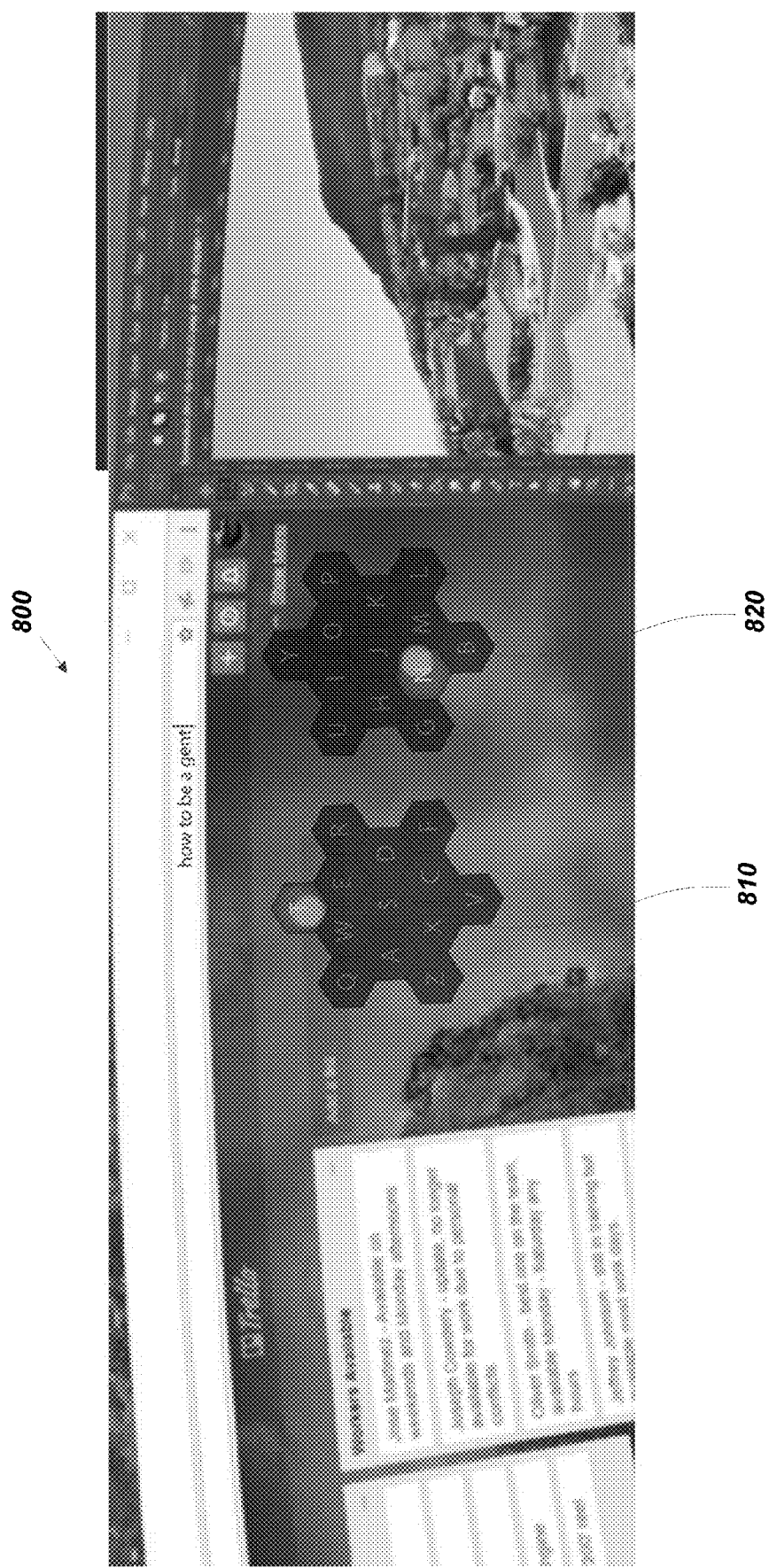
FIG. 8 shows a virtual workspace in accordance with an embodiment of the present disclosure.

FIG. 8 shows a virtual workspace 800 where fractal keyboards 810 and 820 in accordance with embodiments of the disclosure are displayed and used to interact with virtual workspace 800.

While letters are shown are shown and described herein, it is specifically contemplated that the selectable objects may be numbers, non-English alphabet characters (e.g., Chinese, Japanese, and Cyrillic characters), symbols, images, and combinations thereof.

One advantage of the embodiments described herein is that a user may learn to select keys on a directionally oriented keyboard without looking at a visual representation of the directionally oriented keyboard, for example, in a virtual workspace.

Another advantage of one or more of the embodiments described herein is that directionally oriented interfaces may be customized for each business application.

Another advantage of one or more embodiments described herein is that conventional application programming interfaces (API's) may be incorporated, and such API's may provide auto-correct and auto-suggest for incorrectly "typed" keys.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

We claim:

1. A method of using a directionally oriented keyboard at a virtual reality environment, the method comprising:
   receiving directional information while a directionally oriented keyboard is invoked;
   displaying a first visual indicator for a selected segment of the directionally oriented keyboard responsive to the directional information, the selected segment including a first number of selectable objects in a first concentric region and a second number of selectable objects in a second, different concentric region, the selectable objects of the first and second number of selectable objects arranged at locations such that paths are visually defined that extend in a substantially linear manner from a common reference location to respective selectable objects and respective ones of the paths provide respective ones of the selectable objects a direct line of sight to the common reference location;
   identifying a selectable object of the first number of selectable objects of the selected segment responsive to the directional information;
   displaying a second visual indicator for the identified selectable object responsive to identifying the selectable object; and
   providing the selectable object to a business application that is associated with the directionally oriented keyboard.

2. The method of claim 1, wherein the identifying the selectable object responsive to the directional information comprises:
   identifying the selectable object responsive to determining that a first direction of the directional information matches a second direction that is associated with the selectable object.

3. The method of claim 2, wherein the determining that a first direction of the directional information matches a second direction that is associated with the selectable object comprises:
   comparing the first direction of the directional information to one or more directions associated with selectable objects of the directionally oriented keyboard; and
   identifying the second direction of the one or more directions responsive to the comparing.

4. The method of claim 1, wherein the identifying the selectable object responsive to the directional information comprises:
   providing an indicator at the selectable object responsive to the directional information.

5. The method of claim 1, further comprising:
   invoking the directionally oriented keyboard, the invoking comprising:
   presenting a directional indicator, the directional indicator configured to point in one or more directions; and
   presenting selectable objects around the directional indicator.

6. The method of claim 5, wherein the presenting the selectable objects around the directional indicator comprises:
   presenting a first selectable object at a first location associated with a first direction of the one or more directions the directional indicator is configured to point; and
   presenting a second selectable object at a second location associated with a second direction of the one or more directions the directional indicator is configured to point.

7. The method of claim 6, wherein the presenting the selectable objects around the directional indicator comprises:
   presenting a first selectable object at a first location; and
   presenting a number of selectable objects at a number of locations around and outward from the first location.

8. The method of claim 5, wherein the presenting the selectable objects around the directional indicator comprises:
   presenting the selectable objects around the directional indicator; and presenting alpha-numeric characters at the presented selectable objects.

9. The method of claim 5, wherein the presenting the selectable objects around the directional indicator comprises:
presenting the selectable objects around the directional indicator; and
presenting panels around the directional indicator, each panel of the panels comprising one or more of the selectable objects.

10. The method of claim 1, wherein the providing the selectable object to the business application that is associated with the directionally oriented keyboard, comprises:
providing an alpha-numeric character associated with the selectable object to the business application that is associated with the directionally oriented keyboard.

11. The method of claim 1, further comprising invoking the directionally oriented keyboard, the invoking comprising presenting a first and a second fractal keyboard.

12. The method of claim 11, wherein the presenting the first and the second fractal keyboards comprises:
presenting first selectable objects in a first symmetrical pattern; and
presenting second selectable objects in a second symmetrical pattern.

13. The method of claim 12, wherein the presenting the first and the second fractal keyboards comprises:
presenting a first and second fractal keyboards such that respective selectable objects of the first and second fractal keyboards are arranged symmetrically.

14. A method of interacting with a business application in a virtual workroom, the method comprising:
receiving a request to invoke a virtual keyboard;
retrieving a map that defines a layout for keys and key locations of the virtual keyboard;
displaying the virtual keyboard according to the layout;
receiving directional information;
identifying a segment including a number of keys of the virtual keyboard responsive to the directional information, the identified segment including a first concentric region including at least one key of the number of keys and a second, different concentric region including at least one other key of the number of keys, the number of keys arranged at locations such that paths are visually defined that extend in a substantially linear manner from a common reference location to respective keys of the number of keys and respective ones of the paths provide respective ones of the keys a direct line of sight to the common reference location;
displaying a first visual indication for the identified segment;
identifying a key of the number of keys of the virtual keyboard that is assigned to a direction that corresponds to the directional information;
displaying a second, different indication at the identified key of the virtual keyboard;
receiving a confirmation; and
sending information associated with the identified key to a business application.

15. A system for providing a virtual workspace, the system comprising:
an input device including a first directional indicator and a second directional indicator; and
a virtual reality headset, wherein the virtual reality headset is configured to provide a user with a virtual environment comprising:
a business application;
a virtual workspace configured to provide the business application to a user of the virtual workspace; and
a virtual keyboard application configured to provide a virtual keyboard within the virtual workspace and enable a user to interact with the business application using, at least in part, the first directional indicator and the second directional indicator of the input device, the first directional indicator being associated with a first sub-keyboard of the virtual keyboard and configured to point to selectable objects of a first group of objects of the first sub-keyboard and the second directional indicator being associated with a second sub-keyboard of the virtual keyboard and configured to point to selectable select objects of a second group of objects of the second sub-keyboard, wherein respective selectable objects of the first group of objects different than respective selectable objects of the second group of objects.

16. The method of claim 1, wherein displaying the first visual indicator for the selected segment comprises displaying the selected segment with a first shading.

17. The method of claim 16, wherein displaying a second visual indicator for the identified selectable object comprises displaying the identified selectable object with a second, different shading.

18. The method of claim 14, wherein:
displaying the first visual indication for the identified segment comprises shading the identified segment with a first shading; and
displaying the second, different indication at the identified key comprises shading the identified key with a second, different shading.

19. The system of claim 15, wherein each of the first directional indicator and the second directional indicator comprises a thumbstick input device, the first directional indicator being dedicated to select keys of the first group of objects of the virtual keyboard and the second directional indicator being dedicated to a select keys of the second group of objects of the virtual keyboard.

20. The system of claim 15, wherein the first directional indicator is configured to select one of a number of segments and the second directional indicator is configured to select one of a number of keys in a selected segment of the number of segments.

* * * * *

UNITED STATES PATENT AND TRADEMARK OFFICE
CERTIFICATE OF CORRECTION

PATENT NO. : 11,379,051 B2
APPLICATION NO. : 16/271613
DATED : July 5, 2022
INVENTOR(S) : David Levon Swanson and Jared William Schrock It is certified that error appears in the above-identified patent and that said Letters Patent is hereby corrected as shown below:

In the Specification
    Column 4, Line 41, change "lxx" to --1xx--

In the Claims
Claim 15, Column 14, Lines 25-26, change "selectable select objects" to --selectable objects--

Signed and Sealed this
Thirteenth Day of June, 2023

Katherine Kelly Vidal
*Director of the United States Patent and Trademark Office*